Dec. 6, 1960   E. C. THOMSON ET AL   2,963,622
HEADLIGHT BEAM CONTROL SYSTEM FOR AUTOMOBILES
Filed Oct. 16, 1959
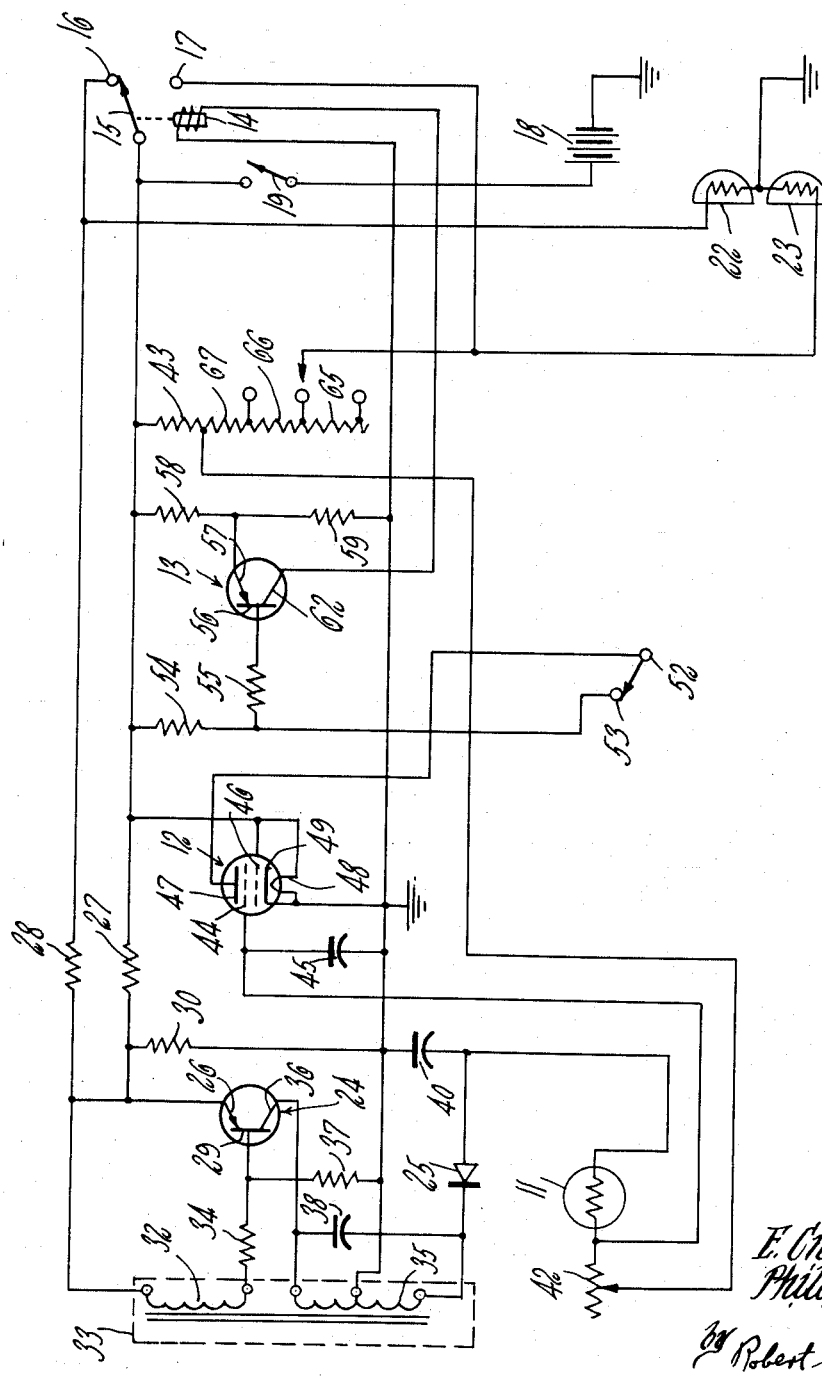
Inventors
E. Craig Thomson
Phillip T. Cade
by Robert S. Toperzer Atty.

United States Patent Office 2,963,622
Patented Dec. 6, 1960

2,963,622

HEADLIGHT BEAM CONTROL SYSTEM FOR AUTOMOBILES

Elihu Craig Thomson, Wellesley, and Phillip J. Cade, Winchester, Mass., assignors to Electronics Corporation of America, Cambridge, Mass., a corporation of Massachusetts Filed Oct. 16, 1959, Ser. No. 846,890

8 Claims. (Cl. 315—83)

This invention relates to controls for automobile headlights, and in particular it is concerned with automatic switching of the headlight beams from high to low when light from another automobile is sensed.

Although automatic headlight beam control equipment has been available commercially for several years, relatively few automobiles are so equipped, at least in terms of the overall potential that exists for this kind of equipment. One of the reasons why, of course, is the cost of the equipment but there are other very significant reasons which can be ascribed to certain operational shortcomings. In the first place, sensitivity has been marginal with the result that a shift to low beam often is not made soon enough, especialy under driving conditions where high ambient light is encountered. Then, too, the sensing unit which generally is mounted next to the windshield and contains a photomultiplier sensing device has of necessity been quite large. This makes the unit unattractive from an aesthetic as well as a safety standpoint. Photomultiplier tubes have the added disadvantage of being relatively insensitive to light in the red end of the spectrum such as is produced by automobile tail lights. As a consequence, no shift to low beam occurs with conventional equipment when another car is approached from the rear, as would otherwise be desirable.

A still further disadvantage of photomultiplier tubes, which are relatively costly in themselves, is that they require a high voltage power supply to operate them, which adds still more to the complexity and cost of the equipment and necessitates that a control unit of considerable size be used with the sensing unit.

Another undesirable characteristic of conventional equipment is that it does not always respond in the same way to a given light level because of changes in the circuit parameters, particularly the battery voltage. If a beam switching operation once made is effectively countermanded for this reason, or for the reason that the light level changes due to a small change in direction of the light beam, the result is especially bad because it induces the oncoming driver to "flick" his lights, thereby impairing the concentration and vision of both drivers in a passing situation. The situation is even more aggravated, of course, if flicking of his lights by the one driver initiates responses in the form of additional beam-switching operations by the automatic equipment.

Accordingly, it is a general object of the present invention to provide an improved headlight beam control system for automobiles.

It is a more specific object of the invention to provide a highly compact system of the above-mentioned character which is completely reliable in operation and yet is relatively inexpensive to manufacture.

A further object is to provide a more sensitive beam control system.

Still another object is to provide a beam control system which is adapted to maintain the beam in a selected position to which it has been shifted until the light level is substantially more or less than that responsible for the initial shift, thereby eliminating spurious responses.

A further object is to provide a headlight beam control system which is adapted to last at least as long as a modern automobile and which is not adversely affected by changes in the characteristics of the component parts during its life.

With reference now to the drawings it will be observed that the headlight control system according to the present invention embodies a photo-conductive cell 11, a vacuum tube voltage amplifier stage featuring a tetrode 12, and a power amplifier which uses a transistor 13. The latter in turn serves to control a relay whose coil has been designated 14 and whose contacts have been designated 15, 16, and 17. Movable contact 15 is connected to the automobile battery 18 through the same switch 19 as is normally used to turn on the automobile headlights. Stationary contact 16 is connected to the low beam filament 22 of the automobile headlights while the other stationary contact 17 is connected to the filament 23 which produces the high beam. A ground connection which is common to the filaments and to the negative terminal of the battery completes the headlight circuit.

Power to operate the amplifier stages is obtained from the battery 18 while the voltage to which the amplifier stages are responsive is obtained from a transistor 24 adapted to serve as an oscillator and a diode 25 which rectifies the oscillator output. To this end, the emitter 26 of transistor 24 is connected to movable relay contact 15 through a resistor 27 and also to stationary contact 16 through a resistor 28. The junction of the resistors is connected to ground through a resistor 30 thereby forming a voltage dividing arrangement. The reason for this arrangement lies in the differential operation of the relay, as will be described in detail hereinafter.

Connecting the emitter 26 to the base 29 of the transistor is a resistor 34 and a feedback winding 32 on a transformer 33 in series therewith. The primary winding 35 of the transformer has one of its ends connected to the collector 36 of the transistor and the other of its ends connected to the cell through the diode 25. It also has a center tap which is grounded as is a biasing resistor 37 tied to the base. Finally, a capacitor 38 is connected across the winding 35 and a capacitor 40 is connected from the diode to ground for filtering purposes.

To apply the voltage which is developed by the transistor oscillator stage to the voltage amplifier stage in a manner whereby the value of the voltage is controlled by the cell, there is connected in series relation to the cell a protentiometer 42 having one of its ends open-circuited in the manner of a rheostat. The potentiometer in turn is connected to the movable relay contact 15 through a resistor 43 while the junction of the potentiometer and the cell is connected to the control grid 44 of the tetrode 12. There is also a filter capacitor 45 connected between grid and ground.

Tetrode 12 has another grid 46 which is used to produce a virtual cathode, and in this way make it possible to obtain a relatively large amount of amplification with the relatively low voltage for the plate 47 which the battery 18 provides, namely twelve volts. Tetrodes of this type are known to those skilled in the art, such as for example the 12K5 whose filament and cathode have been designated 48 and 49, respectively. As shown, one end of the filament is connected to the movable contact 15 as is the grid 46, while the other end of the filament is connected to ground along with the cathode 48. The plate 47 is adapted to be energized independently of transistors 13 and 24, and to this end it is connected to the relay contact 15 through a pair of contacts 52, 53 on the plate side of its load resistor 54. The contacts 52 and 53 are intended to represent the usual high-low beam foot switch which is found in an automobile.

To apply the output of the tetrode 12 to the power amplifier stage, plate 47 is connected through the foot switch and a resistor 55 to the base 56 of the power transistor 13. The emitter 57 of the power transistor is biased by means of a voltage dividing arrangement comprising resistors 58 and 59 which are connected between the movable relay contact 15 and ground. The relay coil itself is connected directly in the load circuit between the collector 62 and ground.

Completing the system is an adjustable feed-back arrangement which comprises a series of resistors 65–67, a selected one of which is adapted to be connected between the relay contact 17 and the resistor 43. This feed-back arrangement will likewise be covered in detail in the description of the operation of the system which follows.

In operation, the transistor oscillator stage is designed to provide only a relatively small amount of power since that is all that is required by the high impedance grid circuit of the voltage amplifier stage. The rectified output voltage from the oscillator which may range, for example, between −16 and −40 volts, appears across the capacitor 40, and the same voltage augmented by the voltage of the battery appears across the series combination of the cell, the potentiometer and resistor 43. Accordingly, the potential of the junction between the potentiometer and the cell is dependent upon the relative resistances of the cell and the potentiometer. For example, when the amount of light impinging upon the cell increases, thereby decreasing the cell's resistance, the junction becomes more negative. Conversely, with less light on the cell the junction is more positive. Increasing and decreasing the resistance of the potentiometer to change the sensitivity of the system has just the reverse effect.

The tetrode is controlled in the usual way by the amount of bias applied to the grid 44, which bias is derived from the junction of the photocell and the potentiometer. If it be assumed that the photocell "sees" a relatively large amount of light so that its resistance is low, tetrode 12 becomes heavily biased, preferably to cut-off. As a consequence, the base of transistor will be placed at a potential substantially equal to that of the battery, while the emitter is held at a significantly lower potential by the voltage dividing action of resistors 58 and 59. In other words, transistor 13 will likewise be heavily biased so that very little current is permitted to flow in its load circuit incorporating the relay coil. With relay coil 14 de-energized, the relay contacts assume their normal positions wherein contact 15 makes with contact 16, connecting the low beam filament in circuit with the battery. Now if it be assumed that the amount of light falling on the photocell decreases, as for example when an oncoming head-lighted car is passed, the cell resistance will increase, making the control grid of the tetrode more positive and causing it to conduct. This will lower the potential of the base of transistor 13 so that it likewise will conduct and energize the relay coil 14. In consequence, contact 15 will make with contact 17 which will close the circuit to the high beam filament and open the low beam circuit.

In order to insure that a substantial change in light conditions must take place to cause the relay contacts to open once they have closed and vice versa, the circuit features two feed-back arrangements. In consequence thereof, for example, small changes in the direction of the received headlight beam, once it has initiated a shift to low beam, can be tolerated without a return to high beam. A first of these feed-back arrangements involves the oscillator stage. Thus, when the light level on the photocell falls to the extent that the relay contact 15 which was in its low beam position is caused to move towards its high beam position, resistor 28 becomes open-circuited. In consequence thereof, the emitter voltage of transistor 24 decreases, causing it to oscillate less strongly and its output voltage to decrease. This corresponds to a decreased amount of bias on the tetrode 12 so that it conducts more strongly as does transistor 13. In other words, the overall effect is to increase the tendency of the relay to pull in by way of the increased output of transistor 24.

Now when the contact 15 makes with contact 17, that is, when the high beam is turned on, one of the resistors 65–67 becomes tied to the high side of the battery depending upon the initial selection of a resistor for connection to the high contact. In any event, whichever resistor it is will cause the voltage at the junction of the photocell and the potentiometer to increase thereby decreasing the amount of bias on the tetrode. As before, this causes transistor 13 to conduct more strongly so that there is less tendency for the relay to return to its normal state. To disable the system temporarily so that the headlights are caused to remain in their low beam condition at the option of the driver of the automobile, the position of the contact 52 is changed. This removes the plate voltage from the tetrode with the result that transistor 13 becomes heavily biased and the relay de-energized.

Another advantage of the feedback arrangements is that they prevent improper relay operation such as contact arcing. If contacts 15 and 16 start to break, as soon as the smallest voltage appears between them, the oscillator voltage will drop which causes an increase in relay current to aid the break. Similarly, when contacts 15 and 17 start to break, the voltage at the junction of resistors 43 and 67 starts to drop, which results in a decrease of relay current to aid their break. In sum, as the contacts transfer, one feedback operation is introduced at break and the other at make.

Although the system of the invention has been described in connection with a single preferred embodiment, it will be appreciated by those skilled in the art that this embodiment is susceptible of various modifications that are within the spirit and scope of the invention. For example, a different type of switching arrangement to disable the system may be used which is adapted to permit manual changes to the high beam as well as to the low beam to be made. Therefore the invention should not be deemed to be limited to the details of what has been described herein by way of illustration but rather it should be deemed to be limited only by the scope of the appended claims.

What is claimed is:

1. An automatic headlight beam control system for an automobile, comprising a photoconductive device to sense light from a source in the vicinity of the automobile, a transistor oscillator to develop a voltage substantially in excess of the automobile battery voltage, a rectifier to convert the oscillator voltage to a direct voltage, first circuit means to derive from said direct voltage a signal volatge whose value is dependent upon the resistance of said photoconductive device, an amplifier to develop a control signal in response to said signal voltage, a relay adapted to selectively energize the high and low beam filaments of the automobile in response to said control signal, and second circuit means to change the value of said signal voltage in accordance with the condition of said relay.

2. An automatic headlight beam control system for an automobile, comprising a photoconductive device to sense light from a source in the vicinity of the automobile, a transistor oscillator to develop a voltage substantially in excess of the automobile battery voltage, a rectifier to convert the oscillator voltage to a direct voltage, first circuit means to derive from said direct voltage a signal voltage whose value is dependent upon the resistance of said photoconductive device, a vacuum tube voltage amplifier to effectively amplify said signal voltage, a transistor power amplifier to develop a control signal in response to the amplified signal voltage, a relay adapted to selectively energize the high and low beam filaments of the automobile in response to said control signal, and second circuit means responsive to the operation of said relay to change the voltage developed by said transistor oscillator.

3. An automatic headlight beam control system for an automobile, comprising a photoconductive device to sense light from a source in the vicinity of the automobile, a transistor oscillator to develop a voltage substantially in excess of the automobile battery voltage, said oscillator being provided with a biasing voltage, a rectifier to convert the oscillator voltage to a direct voltage, first circuit means to derive from said direct voltage a signal voltage whose value is dependent upon the resistance of said photoconductive device, an amplifier to develop a control signal in response to said signal voltage, a relay having normally open and normally closed contacts, said closed contacts being connected in circuit with the low beam filament of the automobile headlights to energize the same in the absence of a control signal, and said normally open contacts being connected in circuit with the high beam filament of the automobile to energize the same when a control signal is present, and second circuit means controlled by said relay to decrease the bias voltage applied to said oscillator as soon as the normally closed contacts of said relay are broken.

4. An automatic headlight beam control system for an automobile, comprising a photoconductive device to sense light from a source in the vicinity of the automobile, a transistor oscillator to develop a voltage substantially in excess of the automobile battery voltage, a rectifier to convert the oscillator voltage to a direct voltage, first circuit means to derive from said direct voltage a signal voltage whose value is dependent upon the resistance of said photoconductive device, an amplifier to develop a control signal in response to said signal voltage, a relay having normally open and normally closed contacts, said closed contacts being connected in circuit with the low beam filament of the automobile to energize the same in the absence of a control signal and said open contacts being connected in circuit with the high beam filament of the automobile headlights to energize the same when a control signal is present, and second circuit means to provide a bias voltage to said oscillator whose value is dependent upon the condition of said relay, said second circuit means including a first and a second resistor connected in series with one another across the automobile battery voltage, and a third resistor connected from the junction of said first and second resistors to one of said normally closed contacts.

5. An automatic headlight beam control system for an automobile, comprising a photoconductive device to sense light from a source in the vicinity of the automobile, a transistor oscillator to develop a voltage substantially in excess of the automobile battery voltage, a rectifier to convert the oscillator voltage to a direct voltage, a biasing circuit to derive from said direct voltage a signal voltage whose value is dependent upon the resistance of said photoconductive device, a vacuum tube voltage amplifier to effectively amplify said signal voltage, a transistor power amplifier to develop a control signal in response to the amplified signal voltage, a relay adapted to selectively energize the high and low beam filaments of the automobile in response to said control signal, and circuit means to change the value of said signal voltage in accordance with the condition of said relay.

6. An automatic headlight beam control system for an automobile, comprising a photoconductive device to sense light from a source in the vicinity of the automobile, a transistor oscillator to develop a voltage substantially in excess of the automobile battery voltage, a rectifier to convert the oscillator voltage to a direct voltage, a biasing circuit to derive from said direct voltage a signal voltage whose value is dependent upon the resistance of said photoconductive device, a vacuum tube voltage amplifier to effectively amplify said signal voltage, a transistor power amplifier to develop a control signal in response to the amplified signal voltage, a relay adapted to selectively energize the high and low beam filaments of the automobile in response to said control signal, and circuit means to change the value of said signal voltage in accordance with the condition of said relay, said circuit means including at least one resistor coupled between the high beam filament and said biasing circuit.

7. An automatic headlight beam control system for an automobile, comprising a photoconductive device to sense light from a source in the vicinity of the automobile, a transistor oscillator to develop a voltage substantially in excess of the automobile battery voltage, said oscillator being provided with a biasing voltage derived from the automobile battery, a rectifier to convert the oscillator voltage to a direct voltage, a circuit to derive from said direct voltage a signal voltage whose value is dependent upon the resistance of said photoconductive device, a vacuum tube voltage amplifier to effectively amplify said signal voltage, a transistor amplifier to develop a control signal in response to the amplified signal voltage, a relay adapted to selectively energize the high and low beam filaments of the automobile in response to said control signal, first circuit means to change the bias voltage applied to the oscillator when the condition of said relay changes, and second circuit means to change the signal voltage applied to said voltage amplifier when the condition of said relay changes.

8. An automatic headlight beam control system for an automobile, comprising a photoconductive device to sense light from a source in the vicinity of the automobile, a transistor oscillator to develop a voltage substantially in excess of the automobile battery voltage, a rectifier to convert the oscillator voltage to a direct voltage, a biasing circuit to derive from said direct voltage a signal voltage whose value is dependent upon the resistance of said photoconductive device, a vacuum tube voltage amplifier to effectively amplify said signal voltage, a transistor power amplifier to develop a control signal in response to the amplified signal voltage, a relay having normally open and normally closed contacts, said closed contacts being connected in circuit with the low beam filament of the automobile headlights to energize the same in the absence of a control signal, and said open contacts being connected in circuit with the high beam filament of the automobile headlights to energize the same when a control signal is present, first circuit means to alter said signal voltage when the condition of said relay changes, said first circuit means including at least one resistor coupled between a said normally open contact and said biasing circuit, and second circuit means to provide a bias voltage to said oscillator whose value is dependent upon the condition of said relay, said second circuit means including a first and a second resistor connected in series with one another across the automobile battery voltage, and a third resistor connected from the junction of said first and said second resistors to one of said normally closed contacts.

References Cited in the file of this patent

UNITED STATES PATENTS

| | | |
|---|---|---|
| 2,773,219 | Aron | Dec. 4, 1956 |
| 2,786,964 | De Witt et al. | Mar. 26, 1957 |